US006216170B1

(12) United States Patent
Giovannoni et al.

(10) Patent No.: US 6,216,170 B1
(45) Date of Patent: Apr. 10, 2001

(54) METHODS AND APPARATUS FOR INTERCONNECTING PERSONAL COMPUTERS (PCS) AND LOCAL AREA NETWORKS (LANS) USING PACKET PROTOCOLS TRANSMITTED OVER A DIGITAL DATA SERVICE (DDS)

(75) Inventors: Michael Joseph Giovannoni, Geltsville; Joseph David Kralowetz; James Francis Landry, both of Germantown; Thomas DeBruyne Stearns, Gaithersburg, all of MD (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/798,273

(22) Filed: Feb. 14, 1997

Related U.S. Application Data

(62) Division of application No. 08/383,302, filed on Feb. 3, 1995, now Pat. No. 5,659,684.

(51) Int. Cl.[7] .................................................. G06F 13/00
(52) U.S. Cl. ............................................. 709/250; 370/465
(58) Field of Search ............................... 395/183.06, 893; 439/55; 379/93; 375/227; 370/397, 79, 91, 465, 60, 392; 707/513; 709/213, 249, 250; 710/200

(56) References Cited

U.S. PATENT DOCUMENTS

| 4,547,880 | * | 10/1985 | De Vita et al. ........................ 370/91 |
| 5,249,292 | * | 9/1993 | Chiappa ................................ 370/392 |
| 5,432,907 | * | 7/1995 | Picazo, Jr. et al. ................... 709/249 |
| 5,438,614 | * | 8/1995 | Rozaman et al. ...................... 379/93 |
| 5,483,530 | * | 1/1996 | Davis et al. ........................... 370/79 |
| 5,509,811 | * | 4/1996 | Homic ................................... 439/55 |
| 5,577,033 | * | 11/1996 | Chang et al. .......................... 370/60 |
| 5,659,684 | * | 8/1997 | Giovannoni et al. ................. 709/213 |
| 5,664,231 | * | 9/1997 | Postman et al. ...................... 395/893 |
| 5,784,622 | * | 7/1998 | Kalwitz et al. ....................... 710/200 |
| 5,812,756 | * | 9/1998 | Taylor .............................. 395/183.06 |
| 5,818,842 | * | 10/1998 | Burwell et al. ....................... 370/397 |

OTHER PUBLICATIONS

Design of the ISDN PC card, Kitamura et al IEEE, 1994.*
An ISDN Interface for the PC Compatible, Broderick et al., IEEE, 1992.*
A Token Ring LAN for Campus Wide Communication Based on The TI TMS380 Adapter Chipset Gaziani et al . IEEE, 1990.*
European Telecommunications Standards Institute, European Telecommunications Standard ETS, ETS 300 325 "Integrated Services Digital Network (ISDN); Programming Communication Interface (PCI) for Euro–ISDN" (Mar., 1994).

* cited by examiner

Primary Examiner—Robert B. Harrell
Assistant Examiner—Thong Vu
(74) Attorney, Agent, or Firm—McDonnell Boehnen Hulbert & Berghoff

(57) ABSTRACT

Methods and apparatus for providing virtual local connection of one PC to another PC, a PC to a LAN and from one LAN to another LAN, over a synchronous digital wide area network (effectively enabling a LAN to be extended through a synchronous digital wide area network on a virtual basis), using a PC adapter card that includes an on board Data Service Unit (DSU)/Channel Service Unit (CSU), driven by control means that functions at least in part as a LAN interface emulator. The invention includes methods (and corresponding apparatus) for configuring the PC adapter card under program control; for establishing connectivity between at least one PC and at least one LAN, each separately connected to the network, via a gateway access thru the digital wide area network; and for utilizing the PC motherboard microprocessor to run user applications software while simultaneously being able to handle the real time constraints of running packet protocols (e.g., Frame Relay, X.25, SMDS, etc.), using a novel control means.

25 Claims, 10 Drawing Sheets

US 6,216,170 B1

METHODS AND APPARATUS FOR INTERCONNECTING PERSONAL COMPUTERS (PCS) AND LOCAL AREA NETWORKS (LANS) USING PACKET PROTOCOLS TRANSMITTED OVER A DIGITAL DATA SERVICE (DDS)

CROSS-REFERENCE TO RELATED APPLICATIONS

This is a division of application Ser. No. 08/383,302, filed on Feb. 3, 1995, now issued as U.S. Pat. No. 5,659,684.

BACKGROUND OF THE INVENTION

1. Field of the Invention

The invention relates generally to methods and apparatus for providing connectivity between personal computers (PCs) and local area networks (LANs) using standardized packet protocols to transmit data packets over a digital wide area network of synchronous digital lines, including a digital data service (DDS) wide area network, such as a Frame Relay network.

More particularly, the invention relates to methods and apparatus for providing virtual local connection of one PC to another PC, a PC to a LAN and from one LAN to another LAN, over a digital wide area network; effectively enabling a LAN to be extended through a digital wide area network on a virtual basis.

According to one aspect of the invention, the virtual extension of a LAN through a DDS is accomplished using a unique PC adapter card (hereafter referred to as a PC/DDS adapter card) that includes an on board Data Service Unit (DSU)/Channel Service Unit (CSU), driven by control means (which may, according to a preferred embodiment of the invention, be implemented in software running on the PC motherboard microprocessor), that functions at least in part as a LAN interface emulator.

In other words, applications software running on the PC in which the PC/DDS adapter card is installed is made to "think" the PC is directly connected to a LAN via a standard LAN interface card driven by commercially available LAN interface driver software; when in fact the PC is virtually connected to the LAN (or LAN extension) through a DDS network via the novel PC/DDS adapter card interface to the network, with the PC/DDS adapter card being driven by the aforementioned control means (also referred to as hereinafter as the "DDS Driver").

Further aspects of the invention are directed to providing methods (and corresponding apparatus) for (a) programming (sometimes referred to as "soft setting"; versus manually setting via dip switches, etc.) the PC/DDS adapter card with interrupt request, Direct Memory Access (DMA) channel, adapter card address, and line speed parameters; (b) establishing connectivity between at least one PC and at least one LAN, each separately connected to the network, via a gateway access thru the DDS network; and (c) utilizing the PC motherboard microprocessor to run user applications software while simultaneously being able to handle the real time constraints of running packet protocols (e.g., Frame Relay, X.25, SMDS, etc.), using the novel DDS Driver control means.

2. Brief Description of the Prior Art

With the proliferation of PCs, LANs, and bandwidth intensive applications, the need for high-speed connectivity has spread beyond the major data centers, and out to the smallest branch offices. These factors, combined with an improved communications infrastructure, changing demographics, and ever-changing government regulations have lead to an increasing work-at-home/"telecommuting" work force that requires the cost effective ability to access remotely located LANs, host computers, etc., in a manner that, for example, can interoperate with routers that may already exist on a remote corporate network, etc.

One solution to providing the desired connectivity has been to utilize present day modem interconnect technology to provide an asynchronous interface between, for example, a PC and a wide area network, such as the public switched telephone network (PSTN).

Those skilled in the art will recognize that such solutions for providing connectivity are inherently problematic in that asynchronously transmitted data does not take advantage of the superior throughput capability (increased available bandwidth) of existing synchronous digital transmission systems, including digital wide area networks such as a Digital Data Service (DDS) network (for example, a Frame Relay network), which may also be used to interconnect remotely located PCs, LANs, etc.

DDS networks, such as the Frame Relay example, have the further advantage over the normal PSTN of allowing a multitude of devices to share the same bandwidth on an as needed basis without bandwidth being set aside for the exclusive use of any particular device.

Prior art solutions to the connectivity problem using a DDS network are also known.

For example, a PC can be connected to a DDS using a commercially available FX-E1 Data Service Unit (DSU), provided by ISDN Systems Corporation of Vienna, Va.; coupled to a commercially available DE-11 Channel Service Unit (CSU) provided by General Datacom.

A DSU card, exemplified by the aforementioned FX-E1 card, may be inserted as a daughterboard into an existing PC, such as, for example, an IBM PC-AT ("IBM" is a trademark of the International Business Machines Corporation), to take asynchronous parallel data (for example, byte wide data) transmitted over the PC bus and convert the data to a synchronous serial bit stream (such as V.35), which can then be processed by a DDS hardware interface device (such as the DE-11). The interface device provides data to a physical link into a DDS network in accordance with DDS standards, such as those published (and incorporated herein by reference) in AT&T, Technical Reference 62310, "DSO Digital Local Channel—Description and Interface Specification", issued in August of 1993.

The known solutions for providing connectivity between remotely located PCs, LANs, etc., over a DDS network, suffer from one or more of the following problems: (1) a separate DSU and CSU is required to achieve the desired connectivity; (2) present day DSU and CSU devices are costly, cumbersome to install, particularly in home offices, and consume too much space; (3) commercially available DSU cards, including the exemplary FX-E1 card, requires the manual setting of dip switches to, define the card's address in the PC I/O space, define the card's interrupt line on the PC bus and define the card's DMA (Direct Memory Access) channel to the PC microprocessor memory; and (4) prior art DSU and CSU cards are typically required to have a "smart" design, i.e., they are required have a self contained microprocessor and associated memory for managing DSU and CSU functions.

In view of the state of the art as illustrated by the aforementioned devices for achieving connectivity of PCs and LANs through a DDS network, it would be desirable, in general, to provide methods and apparatus which can be used to establish a virtual local connection of one PC to another PC, a PC to a LAN and from one LAN to another LAN, over a DDS (effectively enabling a LAN to be extended through a DDS on a virtual basis); and at the same time solve the aforestated problems.

In particular, it would be desirable to provide methods and apparatus for achieving connectivity between remotely located PCs, LANs, etc., over a DDS network, which utilize a single integrated PC/DDS adapter card, for performing the functions heretofore performed by separate DSUs and CSUs, to effectively extend a LAN to a PC through the network.

Furthermore, it would be desirable to provide methods and apparatus for achieving the aforestated connectivity and LAN extendability objectives with devices that conserve space, are easy to install and are cost efficient solutions to providing virtual connection to remotely located processing resources, particularly for the home office consumer of such resources.

Still further, it would be desirable to provide methods and apparatus for eliminating the requirement of having to manually set the status of switches to define a PC/DDS adapter card's address in PC I/O space, define the card's interrupt line on the PC bus and define the cards DMA (Direct Memory Access) channel to the PC microprocessor memory.

Further yet, it would be desirable to provide a single integrated PC/DDS adapter card, for achieving the aforestated connectivity and LAN extendability objectives, that does not require an onboard microprocessor and/or associated memory for managing the integrated DSU and CSU functions.

It would also be desirable to provide methods and apparatus for accomplishing the virtual extension of a LAN through a DDS using a PC/DDS adapter card that includes an on board Data Service Unit (DSU)/Channel Service Unit (CSU), driven by control means that function at least in part as a LAN interface emulator.

In addition to all the above, it would be desirable to provide methods and apparatus which facilitate operating the PC/DDS adapter card at any one of a plurality of desired (and changeable) line speeds; establish connectivity between at least one PC and at least one LAN, each separately connected to the network, via a gateway access thru the DDS network; support utilizing a PC's motherboard microprocessor to run user applications software while simultaneously being able to handle the real time constraints of running packet protocols (e.g., Frame Relay, X.25, SMDS, etc.), using the aforementioned DDS Driver control means; support a built-in error rate testing capability on the integrated PC/DDS adapter card (configurable via the PC motherboard microprocessor); and make use of industry standard data encapsulation methods (such as, for example, RFC-1490) to insure that the data transmitted by the PC/DDS adapter card contemplated by the invention can interoperate with routers that may already exist on a corporate network.

SUMMARY OF THE INVENTION

Accordingly, it is an object of the invention to provide methods and apparatus for virtually extending a LAN to a PC through a DDS network using a single integrated PC/DDS adapter card, pluggable into the PC, that includes an on board Data Service Unit (DSU)/Channel Service Unit (CSU).

It is a further object of the invention to provide control means for driving the aforementioned PC/DDS adapter card (preferably implementable in software running on the PC motherboard microprocessor), that functions at least in part as a LAN interface emulator.

A further object of the invention is to provide methods and apparatus for achieving connectivity between remotely located PCs, LANS, etc., realizing the aforestated LAN extendability objective using devices that conserve space, are easy to install and are cost efficient solutions to providing virtual connection to remotely located processing resources.

A still further object of the invention is to provide methods and apparatus for eliminating the requirement of having to manually set switches to configure or reconfigure the PC/DDS adapter card contemplated by the invention, when the card is first installed and/or operating under the control of the PC motherboard microprocessor.

Further yet, it is an object of the invention to provide methods and apparatus for realizing a single integrated PC/DDS adapter card, for achieving the aforestated connectivity and LAN extendability objectives, that does not require an onboard microprocessor and/or associated memory for managing DSU and CSU functions integrated onto the card.

Yet another object of the invention is to provide methods and apparatus which facilitate operating the PC/DDS adapter card at any one of a plurality of desired (and changeable) line speeds; establish connectivity between at least one PC and at least one LAN, each separately connected to the network, via a gateway access thru the DDS network; support utilizing a PC's motherboard microprocessor to run user applications software while simultaneously being able to handle the real time constraints of running packet protocols (e.g., Frame Relay, X.25, SMDS, etc.), using the aforementioned DDS Driver control means; support a built-in error rate testing capability on the integrated PC/DDS adapter card (configurable via the PC motherboard microprocessor); and make use of industry standard data encapsulation methods (such as, for example, RFC-1490) to insure that the data transmitted by the PC/DDS adapter card contemplated by the invention can interoperate with routers that may already exist on a corporate network.

According to one aspect of the invention, the virtual extension of a LAN through a DDS is accomplished using a unique PC/DDS adapter card that includes an on board Data Service Unit (DSU)/Channel Service Unit (CSU), driven by control means (which may, according to a preferred embodiment of the invention, be implemented in software running on the PC motherboard microprocessor), that functions at least in part as a LAN interface emulator.

In other words, applications software running on the PC in which the PC/DDS adapter card is installed is made to "think" the PC is directly connected to a LAN via a standard LAN interface card driven by commercially available LAN interface driver software; when in fact the PC is virtually connected to the LAN (or LAN extension) through a DDS network via the novel PC/DDS adapter card interface to the network, with the PC/DDS adapter card being driven by the aforementioned control means (also referred to hereinafter as the "DDS Driver").

According to one specific aspect of the invention, a method for providing a PC with a transparent virtual connection to a LAN, extended thru a DDS wide area network to the PC, comprises the steps of (a) emulating the direct connection of the PC to the LAN via a PC/DDS adapter card that functions at least in part as a LAN interface card; and (b) converting between asynchronous parallel data recognized by the PC and synchronous bit serial data which is DDS network compatible.

Furthermore, according to a preferred embodiment of the invention, the step of emulating further comprises the steps of using software modules (to implement "control means" for driving the PC/DDS adapter card), for (a) initializing the PC/DDS adapter card to a predefined operational state; (b) establishing a network level interface to the DDS network via the PC/DDS adapter card; (c) providing a software level interface to network applications software running on the PC; (d) reformatting data provided via a transmit request from applications software running on the PC into a form in which it can be sent over the DDS network; and (e) transmitting the reformatted data onto the DDS network via the PC/DDS adapter card.

In the receive direction, the preferred control means processes DDS compatible data (also referred to as synchronous bit serial data) received from the DDS network via the PC/DDS adapter card; reformats the DDS compatible data to applications software compatible format (also referred to as asynchronous parallel data format); and provides the reformatted data to the applications software.

According to a preferred embodiment of the invention, the control means maintains the network link and monitors the network link to detect, recover and report errors occurring at the physical layer of the DDS connection such as along the synchronous digital lines of the digital wide area network.

A further aspect of the invention is directed to a method for providing a LAN gateway access thru the DDS network for establishing connectivity between at least one PC and at least one LAN each separately connected to the DDS network, where the LAN gateway access is preferably implemented as an applications software module on a PC communicating over the aforementioned software level interface.

An alternate characterization of the invention is a method for providing a PC with a transparent virtual connection to a LAN extended thru a DDS wide area network to the PC, comprising the steps of: (a) establishing a communications path between networking software running on the PC and a pseudo LAN interface card installed in the PC; and (b) converting between asynchronous parallel data recognized by the PC and synchronous bit serial data which is DDS compatible utilizing the pseudo LAN interface card.

The invention is also directed to a novel PC/DDS adapter card per se which, preferably under software control, emulates a LAN card and provides a PC with a transparent virtual connection to a LAN extended to the PC thru a DDS wide area network.

The single integrated card contemplated by a preferred embodiment of the invention comprises: (a) data service means (also referred to herein as a data service unit or "DSU"), located on the PC/DDS adapter card and coupled to the PC, for converting between an asynchronous parallel data stream and a synchronous bit serial data stream; and (b) channel service means (also referred to herein as a channel service unit or "CSU"), located on the PC/DDS adapter card and coupled to the data service means, for providing an interface between the data service means and the DDS wide area network.

According to one specific embodiment of the invention the data service means further comprises: (a) PC bus interface means for providing an interface between a PC bus carrying asynchronous parallel data and converter means for converting between asynchronous parallel data and synchronous bit serial data; (b) converter means, coupled to the PC bus interface means, for performing parallel to serial conversion of data being transmitted by the PC over the DDS network and serial to parallel conversion of data being received by the PC over the DDS network; and (c) programmable means, coupled to the PC bus interface means, for providing non-volatile storage of software settable switches under the control of the PC motherboard microprocessor.

According to a preferred embodiment of the invention, the programmable means is a software settable serial EEPROM which may be used to store (a) a starting address for the location of the PC/DDS adapter card in the PC bus memory map; (also referred to as a unique media access control address for the adapter card) (b) an interrupt request line parameter; and (c) a Direct Memory Access (DMA) channel parameter.

According to another specific embodiment of the invention the channel service means further comprises: (a) means for encoding serial signals output from the converter means into a differential bipolar format signal for transmission on the DDS network; (b) DDS line interface means (also referred to as synchronous digital line interface means), coupled to the means for encoding, for performing transmit pulse shaping; and (c) means for physically interconnecting the DDS line interface means with the DDS network.

For receive data processing, according to yet another specific aspect of the invention, the channel service means further comprises: (a) means for decoding differential bipolar format signals received from the DDS network into a single ended format signal for input to the converter means; (b) DDS line interface means, coupled to the means for decoding, for performing receive signal detection and clock recovery at the physical DDS network interface; and (c) means for physically interconnecting the DDS line interface means with the DDS network.

According to a preferred embodiment of the invention, the encoding/decoding function referred to hereinabove is performed by a single, variable rate, DDS encoder/decoder (also referred to as a signal encoder/decoder) which includes a field programmable gate array that may be dynamically programmed to support any one of a plurality of line speeds, and which optionally supports DSU loop back testing.

Further, the encoder/decoder function, contemplated by a preferred embodiment of the invention, contains an integrated Bit Error Rate Tester (BERT) that transmits pseudo-random test patterns (the industry standard patterns of all 0's, all 1's, 511 and 2047) out to the DDS network; and compares the received pattern, bit by bit, to the transmitted pattern when the DDS service provider has configured a loopback in the network. The BERT functions, in a manner well known by those skilled in the art, to detect any bit error induced into the data by the network. By integrating the BERT into the preferred encoder/decoder contemplated by the invention, the service provider is aided in trouble sectionalization without a field service technician at the customer site operating an external BERT unit.

The preferred CSU on the PC/DDS adapter card contemplated by the invention further comprises (a) DDS line interface means, coupled to the aforementioned variable rate DDS encoder/decoder, for performing transmit pulse shaping, receive signal detection and clock recovery at the physical DDS network interface; and (b) means for physically interconnecting the DDS line interface means with the DDS network.

The DDS line interface means contemplated by the preferred embodiment of the invention is capable of detecting signal polarity reversal indicative of a DDS network request for loop back data testing.

Still another aspect of the invention is directed to a method for virtually extending a LAN to a PC through a DDS network, comprising the steps of: (a) utilizing a programmable PC/DDS adapter card, including an on board Data Service Unit (DSU)/Channel Service Unit (CSU), to provide an interface between the PC and the DDS network; and (b) driving the PC/DDS adapter card via control means that functions at least in part as a LAN interface emulator.

This aspect of the invention also comprises the step of programming the PC/DDS adapter card with interrupt request, Direct Memory Access (DMA) channel, adapter card address (or unique media access control address), and line speed parameters; and contemplates the step of establishing connectivity between at least one PC and at least one LAN, each separately connected to the network, via a gateway access thru the DDS network.

The invention features a single integrated PC/DDS adapter card, for extending a LAN through a DDS under the control of the novel DDS Driver, wherein the PC/DDS adapter card contains both the aforementioned DSU and CSU, together with programmable means for specifying interrupt request, Direct Memory Access (DMA) channel, adapter card address, and line speed parameters (also referred to herein as the invention's "SoftSet" feature).

Further features of the invention include the capability of supporting multimedia applications, LAN-based video teleconferencing and Internet access.

Further yet, the invention features the utilization of the PC motherboard microprocessor to run both the user applications software while simultaneously handling the real time constraints of running packet protocols (e.g., Frame Relay, X.25, SMDS, etc.), by executing the novel DDS Driver/control means. The utilization of the PC motherboard microprocessor to handle the management of the packet protocols (by executing the aforementioned DDS Driver), enables the PC/DDS adapter card to be designed as a "dumb" card (i.e., without an on board microprocessor and associated memory), thereby reducing card cost.

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 1 depicts a prior art Data Service Unit (DSU) PC adapter card which may be installed in a PC to facilitate data communications over a synchronous serial interface (SSI) to a separate prior art Channel Service Unit (CSU) that is coupled, utilizing two twisted pairs of telephone wire, to a DDS network.

FIG. 6 depicts the details of the DDS Driver shown in FIG. 5, calling out the Network Adaptation Module(s), DDS Framing Module and Port Driver Module (contemplated by one aspect of the invention) used to set up and manage communications between applications software running on a PC and the DDS network (via a PC/DDS PC adapter card such as the card depicted in FIGS. 3 and 5), to facilitate LAN extension through the DDS network by emulating direct connectivity of the PC to the LAN.

DETAILED DESCRIPTION

Figure 1:
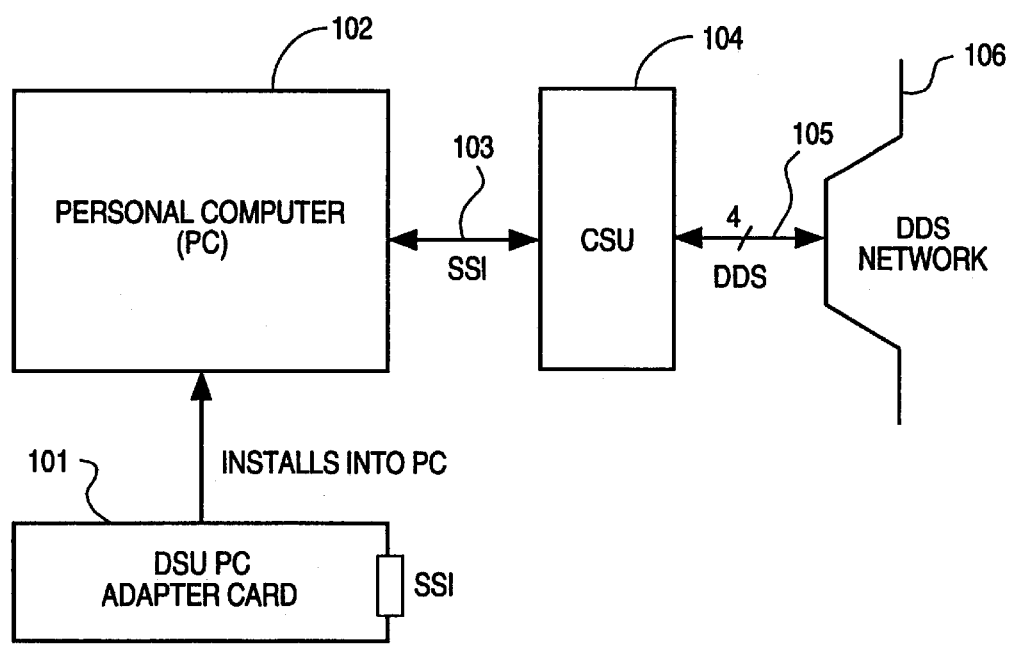
FIG. 1 depicts in block diagram form a prior art arrangement for coupling a PC to a DDS network. In particular.

The PC/DDS adapter card and associated driver (the "DDS Driver"/"control means" referred to hereinbefore) to which the invention is directed will be described hereinafter, for the sake of illustration only, with reference to a commercially available IBM PC-AT personal computer. It will be understood by those skilled in the art that the invention supports connectivity of a broad range of PC products to remote PCs, LANS, etc., and that the description with reference to the exemplary IBM PC-AT is not in any way intended to limit the scope of the invention.

The DDS Driver (control means) will be described hereinafter with reference to a preferred implementation of this portion of the invention as a set of software modules. Those skilled in the art will readily appreciate that such description is for the sake of illustrating the best mode of the invention only and is not intended to limit the scope of the invention which, for example, would also be directed to a hardware implementation, or any combination of hardware and software which implements the described function of the DDS Driver as set forth hereinafter.

The preferred embodiment of the PC/DDS adapter card portion of the present invention is a variable rate device that is an add-in card for the PC-AT bus in the exemplary IBM PC-AT personal computer.

The PC/DDS adapter card contemplated by the invention conforms to all requirements of the previously incorporated ATT Technical Reference 62310 DDS specification for 4-wire data service and will provide the PC with direct access to a single leased or switched DDS line, without requiring an external CSU.

According to one embodiment of the invention, the PC/DDS adapter card and DDS Driver combination supports network data rates of 9.6 Kbps, 19.2 Kbps and 56 Kbps; where data to be transmitted by the user's application is sent out by the PC/DDS adapter card in packetized format, in accordance with Frame Relay access protocols, X.25 packet switching protocols and low-speed SMDS (Switched Multi-Megabit Data Service). The PC/DDS adapter card and DDS Driver contemplated by the invention may be used to interconnect LANs and Remote PCs via Public/Private Frame Relay Networks.

According to one illustrative embodiment of the invention, the DDS Driver/control means provides the commercially available NDIS, ODI (typically used for Internet Packet Exchange ("IPX")), and an FTP Packet Driver (typically used for Transmission Control Protocol/Internet Protocol ("TCP/IP")), as part of a software interface between the user's applications software and the PC/DDS adapter card. With these standard drivers, well known by those skilled in the art, any application that works on Ethernet LANs to access the full resources and services of remote locations can be used.

The aforementioned commercially available drivers, incorporated into the illustrative embodiment of the DDS Driver portion of the invention referred to hereinabove, are described in detail in the following publications which are incorporated herein by reference: (1) "Open Data-Link Interface (ODI) Developer's LAN Driver Toolkit Guide for DOS Workstation HSMs", by Novell, Inc.; (2) "Microsoft/3 COM LAN Manager Network Driver Interface Specification (NDIS)", by Microsoft; and (3) the "Packet Driver Specification", by FTP Software, Inc. Those skilled in the art can readily use these common interfaces to support transmission of, for example, a Frame Relay protocol.

Reference should now be made to FIG. 1 which, as indicated hereinabove, depicts (in block diagram form) a prior art arrangement for coupling a PC to a DDS network.

In particular, FIG. 1 depicts a prior art Data Service Unit (DSU) PC adapter card 101 which may be installed in a PC (such as PC 102 shown in FIG. 1) to facilitate data communications over a synchronous serial interface (SSI), (shown as SSI 103 in FIG. 1) to a separate prior art Channel Service Unit (CSU), (shown as CSU 104 in FIG. 1), depicted as being coupled to DDS network (shown as DDS network 106 in FIG. 1) utilizing two twisted pairs of telephone wire (wire 105).

As specific example of prior art devices that may be used to implement the PC/DDS interconnection shown in FIG. 1 are the aforementioned commercially available FX-E1 Data Service Unit (DSU) card coupled to a separate commercially available DE-11 Channel Service Unit (CSU).

As indicated hereinbefore, DSU card 101 (exemplified by the aforementioned FX-E1 card), may be inserted as a daughterboard into an existing PC, such as the exemplary IBM PC-AT. DSU card 101 takes asynchronous parallel data (for example, byte wide data transmitted over the PC bus) and converts the data to a synchronous serial bit stream (such as a V.35, RS232, RS422 or equivalent digital interface for external connection), which can then be processed by a DDS hardware interface device (such as an external DE-11 CSU converter) to provide data over a physical link to a DDS network in DDS compatible format.

It should be noted that the prior art CSU function (provided by, for example, CSU 104 depicted in FIG. 1), and the CSU function as integrated onto the PC/DDS card contemplated by a preferred embodiment of the invention, is designed to provide surge protection (against lightning strikes and power line crosses in the DDS network) and maintenance loopbacks for trouble-shooting of faulty circuits by the DDS service provider.

The problems associated with the prior art approach of utilizing separate DSU and CSU devices to provide connectivity between remotely located PCs, LANs, etc., over a DDS network (discussed briefly hereinbefore with reference to the background of the invention), include device cost; installation difficulties (particularly in places like a home office where space is at a premium); and the aforementioned requirement for "smart" cards having a self contained microprocessors and associated memory for managing DSU and CSU functions, etc.

Additionally, those skilled in the art will readily appreciate that prior art DSUs, like DSU 101 depicted in FIG. 1, required that manual switches be set to configure a DSU adapter to occupy one or more of the following PC-bus resources (with reference to the exemplary PC-AT): I/O space address range, interrupt request line (IRQ line) and DMA (Direct Memory Access) channel.

It is necessary to allocate these resources between all adapter cards which sit in the user's PC, with the requirement that no 2 adapter cards conflict, i.e. no 2 cards can be assigned the same address, IRQ or DMA lines.

The PC platform provides no convenient way for the user to know which resources are already in use, so frequently a user will mistakenly configure a new adapter card to conflict with a card already in his system, install the new card and observe wildly aberrant behavior when he powers up his machine. The problem can only be resolved by the user first recognizing his mistake (no easy task for a non-technical person), powering off the machine, unplugging the adapter, changing the switches for one of the 3 settable exemplary parameters (IRQ, address, DMA), plug the card back into the machine and try again.

The PC/DDS adapter card contemplated by the invention does not use manual switches for setting these parameters but instead has programmable hardware on the board (to be described in detail hereinafter) which allows software included in the DDS Driver portion of the invention to sense which resources are already in use and guide the user through steps which allow him to set the PC/DDS adapter card for non-conflicting resources.

According to the invention, the user can change the PC/DDS adapter card parameters while the board is powered up in the PC, without the trial and error technique of powering off, removing the card, changing a switch, plugging the board back in and rechecking for conflict.

According to an exemplary preferred embodiment of the invention, as indicated hereinbefore, the CSU integrated onto the PC/DDS adapter card (driven by the DDS Driver portion of the invention), supports 3 data rates; 9.6 Kbps, 19.2 Kbps and 56 Kbps. As is well known by those skilled in the art, for each of these rates the encoding/decoding techniques are different.

To support the different required techniques, the PC/DDS adapter card hardware architecture contemplated by the invention permits the acceptance of different downloadable programs into an encoder-decoder field programmable gate array (FPGA) located on board the PC/DDS adapter card. The encoder/decoder portion of the PC/DDS adapter card contemplated by the invention, together with the other components of the new card, will be described in detail hereinafter with reference to FIGS. 2 and 4.

Traditionally, in addition to the aforementioned manual switches on the prior art DSUs, changing CSU line speeds has required setting manual switches on the CSU. With the ability to download new files to the FPGA, a low gate count FPGA can be used because only one encoder-decoder process needs to reside in the FPGA at any one time.

Figure 2:
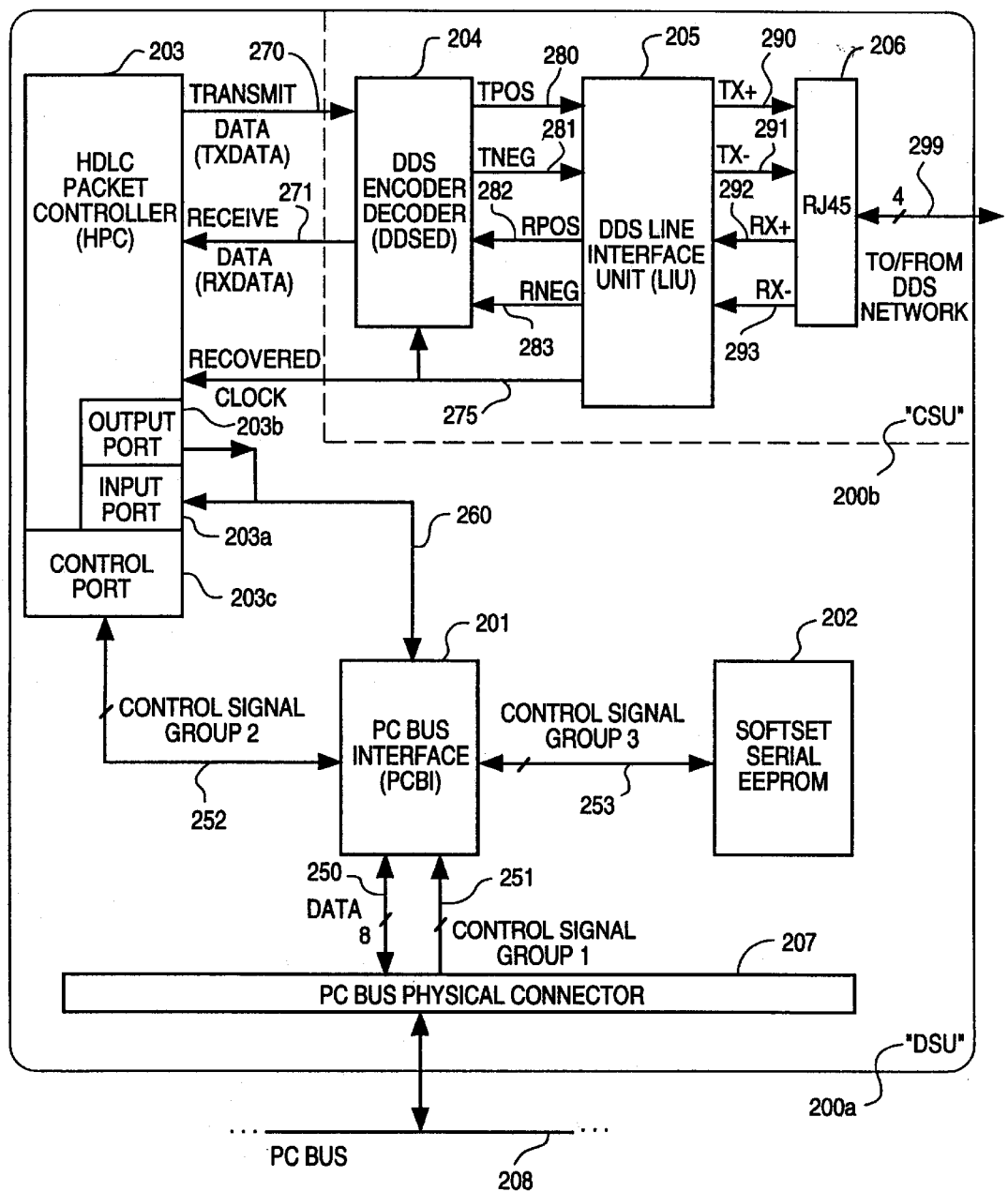
FIG. 2 depicts in the form of a high level functional block diagram the components of a single PC/DDS adapter card, of the type contemplated by the invention, containing an on board DSU and CSU.
Figure 4:
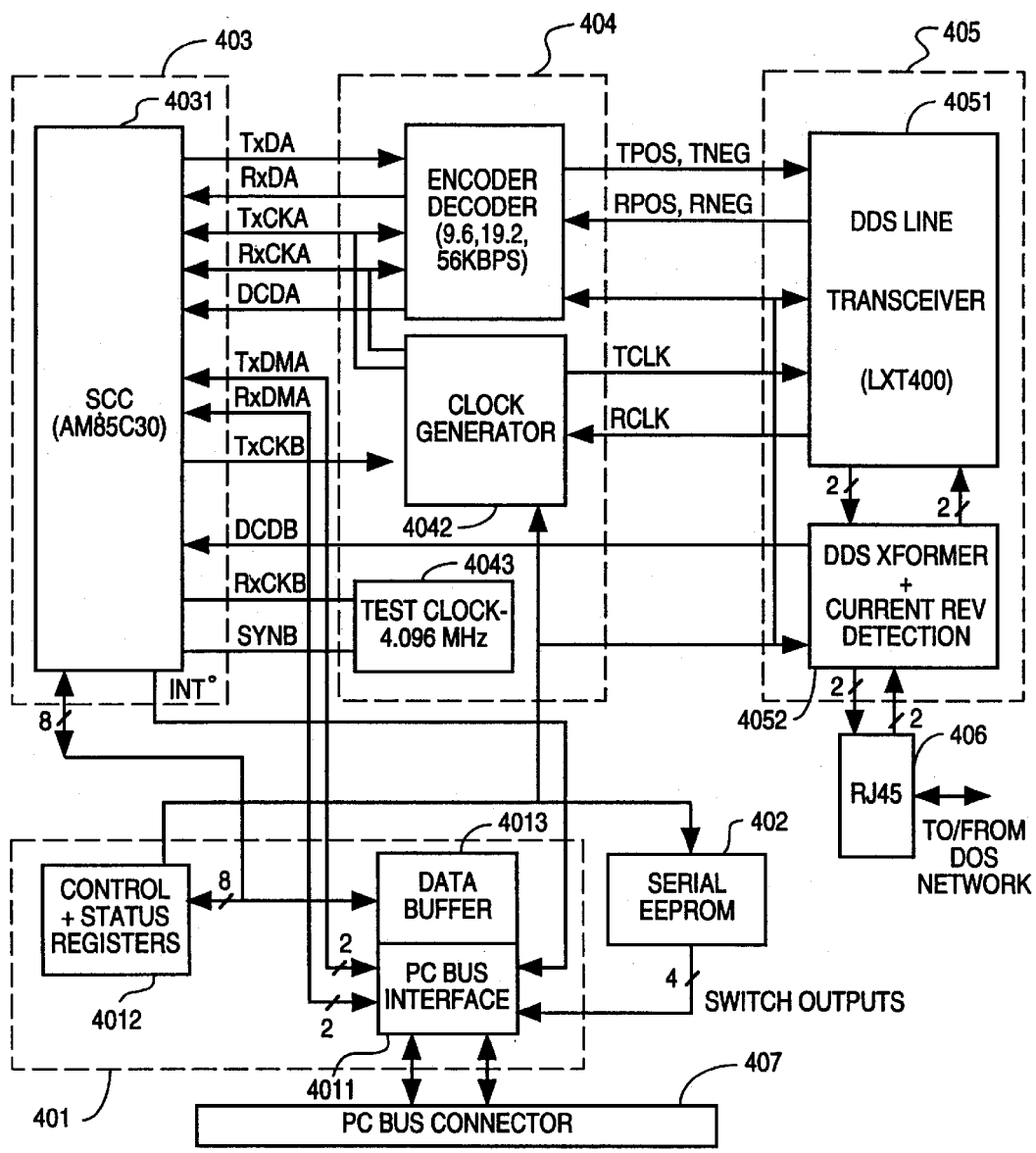
FIG. 4 depicts a specific example of components that when interconnected as shown in FIG. 4 may be utilized to realize the PC/DDS adapter card shown in FIG. 2.

In order to eliminate the expense of purchasing, manually configuring and maintaining a separate CSU; to provide the "SoftSet" capability as discussed hereinbefore, i.e., to eliminate the prior art requirement of having the user manually configure switches and jumpers before installing a DSU adapter card into his PC, etc., the aforementioned DSU and CSU functions are, according to one aspect of the present invention, integrated onto a single, variable rate PC/DDS adapter card of the type depicted in FIGS. 2 and 4.

Reference should now be made to FIG. 2 which, as indicated hereinbefore, depicts (in the form of a high level functional block diagram) the components of a single PC/DDS adapter card, of the type contemplated by the invention, containing an on board DSU and CSU.

In particular, FIG. 2 shows the high level functional blocks of an exemplary PC/DDS adapter card (200) of the type contemplated by the invention, to include PC Bus Interface (PCBI) 201; SoftSet Serial EEPROM (Electrically Erasable Programmable Read Only Memory) 202; HDLC Packet Controller (HPC) 203; DDS Encoder-Decoder (DDSED) 204; DDS Line Interface Unit (LIU) 205; and RJ45 Telephone Jack 206.

The portion of card 200 in FIG. 2 identified as 200a includes those components which functionally performing the previously described DSU functions; while the portion of FIG. 2 identified as 200b includes those components which functionally performing the previously described CSU functions.

PCBI 201 is shown coupled, via a PC bus physical connector, 207, to PC bus 208, which, as indicated hereinbefore, will be assumed to be a PC-AT bus for the sake of illustration only.

As is well known by those skilled in the art, PC bus 208 is a standardized group of signals and physical receptacles into which daughterboards (like the PC/DDS adapter card contemplated by the invention) can be installed. The bus permits the PC's main board (the motherboard) to control and communicate with all installed daughterboards. Examples of the most common bus standards for the PC are ISA (Industry Standard Architecture), EISA (Extended Industry Standard Architecture), MCA (Micro Channel Architecture).

FIG. 2 depicts data being exchanged between PCBI 201 and PC bus 208 via a commercially available connector (PC bus physical connector 207), via link 250 (which consists of 8 data lines for byte wide data and more data lines for wider data exchanges); and Control Signal Group 1, which is comprised of signals that define the bus transaction, e.g. interrupt lines, address lines, DMA control lines, bus timing lines. Control Signal Group 1 off PC Bus 208 is shown input to PCBI 201 via link 251 in FIG. 2.

According to the invention, PCBI 201 in FIG. 2 primarily acts as a byte-wide pipe for the transmission and reception of data packets between the PC motherboard (not shown in FIG. 2) and HPC 203.

According to the embodiment of the invention being described with reference to FIG. 2, to transmit a packet of length N bytes, the PC motherboard sequentially writes the N bytes of data into the input side of a byte-wide FIFO (First In First Out) buffer (described in greater detail hereinafter with reference to FIG. 4) embedded within PCBI 201.

Data passes from the output side of the FIFO to the input port 203a of HPC 203 (over link 260), for eventual serialization and transmission out to the DDS network. In the receive direction, HPC 203 signals PCBI 201 when it has assembled a byte of data received from the DDS network. PCBI 201 responds by reading the data byte from HPC 203's output port (shown as 203b in FIG. 2, coupled to PCBI 201 via link 260); and writing it directly into PC motherboard memory, using one DMA (Direct Memory Access) channel provided by PC bus 208.

Control Signal Group 2, shown in FIG. 2 as being transmitted over link 252, controls the passing of packet data between HPC 203 and PCBI 201. The signals in Control Signal Group 2 also allow the PC motherboard to access HPC 203's control port (shown as 203c in FIG. 2), to program HPC 203's operation mode and to read real-time status from HPC 203 pertaining to packet transmission and reception. The signal group (group 2) also passes an interrupt line from HPC 203 to PCBI 201 and onto PC bus 208, which allows HPC 203 to "wake up" the PC motherboard to request service of events related to packet transmission and reception.

The Softset Serial EEPROM 202 shown in FIG. 2 provides 2 functions for the PC/DDS adapter card contemplated by a preferred embodiment of the invention.

First, non-volatile storage (data remains in EEPROM 202 even when power is turned off) for general information is provided. Secondly, software settable pins which retain their values after power down and therefore emulate traditional manual switches, are provided. The values of the switch pins can be changed, according to the invention, by the PC motherboard through a serial (not byte-wide) interface within the depicted Control Signal Group 3 transmitted over link 253 depicted in FIG. 2.

According to the illustrative embodiment of the invention being described with reference to FIG. 2, four of the switch pins are used by PCBI 201 to select 1 of 16 starting addresses for where the PC/DDS adapter card resides in the PC bus memory map.

HPC 203 depicted in FIG. 2 performs 2 primary functions: parallel-to-serial conversion of transmit data and serial-to-parallel conversion of receive data. HPC 203's serial side connects to DDSED 204 via links 270 and 271 as depicted in FIG. 2; and HPC 203's parallel side connects to PCBI 201, as indicated hereinbefore, via link 260.

On the serial side, HPC 203 formats (and deformats) data according to the HDLC (High Level Data Link Control) protocol.

The HDLC protocol, well known by those skilled in the art, is a bit-oriented protocol which transmits data in packets. When an HDLC transmitter (like HPC 203) has no data to send, it transmits the Idle pattern, which is a recurring sequence of 01111110. To start a packet, the HDLC transmitter sends the first character of the packet, which is a non-idle character that informs the receiver of start of packet. All data transmitted thereafter is part of the data packet. The end of the packet is denoted by an idle character, which is repeated until the next start of packet.

The transmit and receive serial data streams are synchronously timed with the clock recovered from DDS LIU 205 (shown recovered and transmitted to HPC 203 on link 275), which typically runs at 9.6 Kbps (Kilobits per second), 19.2

Kbps or 56 Kbps, depending on the service that the user has leased from the DDS network provider.

On the parallel side, according to the illustrative embodiment of the invention being presented with reference to FIG. 2, data is passed between HPC 203 and PCBI 201 in byte-wide format. Data is cadenced between HPC 203 and PCBI 201 with signals in the aforementioned Control Signal Group 2.

Figure 3:
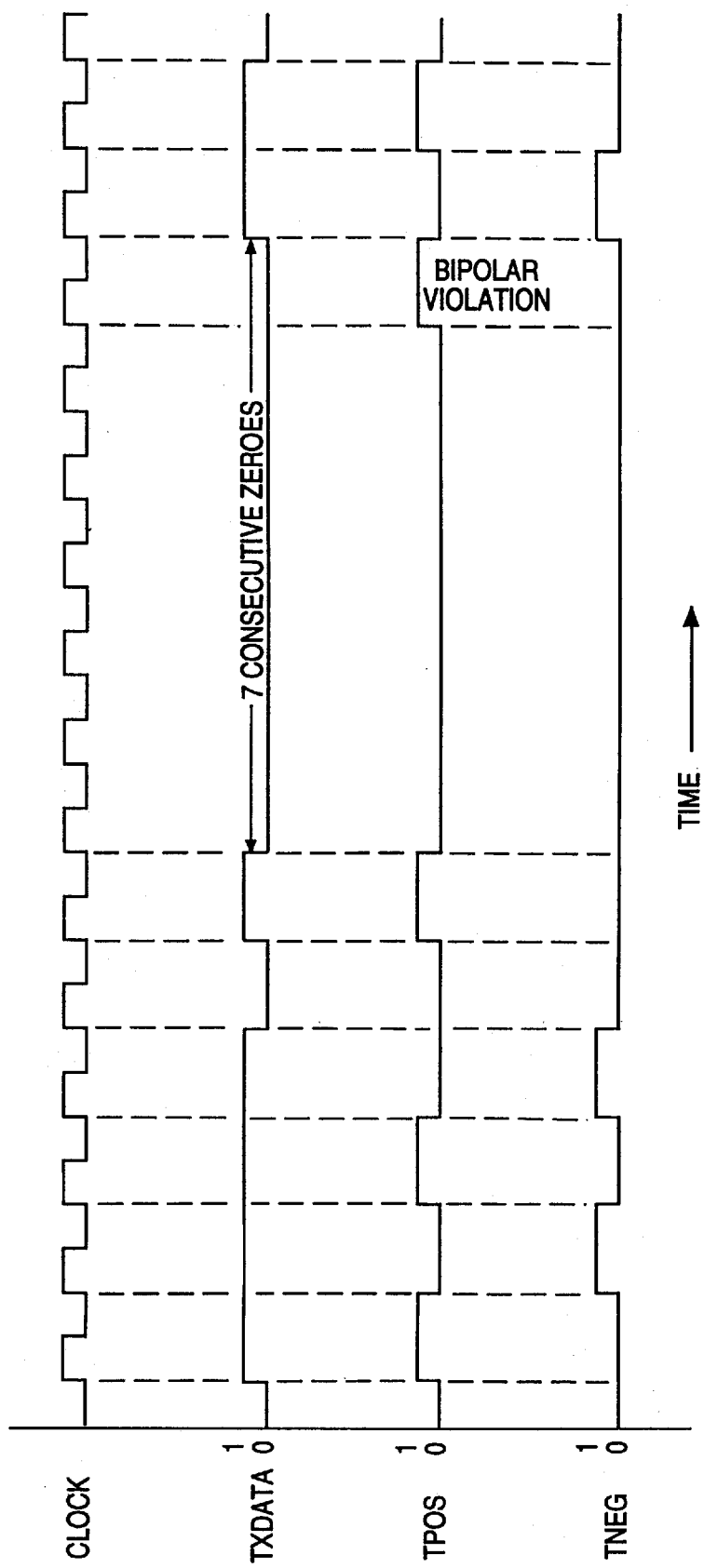
FIG. 3 depicts an example of a differential format Alternate Mark Inversion (AMI) coded signal generated by the encoder (and decoded by the decoder) depicted in FIG. 2.

Along with FIG. 2, reference should now be made to FIG. 3 which, as indicated hereinbefore, depicts an example of a differential format Alternate Mark Inversion (AMI) coded signal generated by DDSED 204 depicted in FIG. 2.

The encoder section of DDSED 204 takes data from TXDATA (transmit link 270 in FIG. 2), in single-ended format, and encodes it into a differential bipolar format on TPOS (Transmit Positive) and TNEG (Transmit Negative), shown as links 280 and 281 respectively in FIG. 2. The differential format, according to a preferred embodiment of the invention, is the aforementioned, well known, Alternate Mark Inversion (AMI) coded signal.

The decoder section of DDSED 204 performs the inverse operation, taking in AMI signals on RPOS/RNEG and converting into single-ended format on RXDATA (RPOS, RNEG and RXDATA are shown in FIG. 2 as links 282, 283 and 271, respectively).

For the sake of completeness, the rules governing AMI format are described hereinafter with reference to FIG. 3.

Rule 1: A binary 0 is transmitted as 0 volts; 0 on both TPOS and TNEG, as shown in FIG. 3.

Rule 2: A binary 1 is transmitted as either a positive pulse (1 on TPOS, 0 on TNEG) or a negative pulse (0 on TPOS, 1 on TNEG), opposite in polarity to the previous binary 1, as shown in FIG. 3.

Rule 2 stated hereinabove is the bipolar rule. The reason for using bipolar encoding in the preferred embodiment of the invention is to ensure that transitions always exist on the signal lines. As is well known by those skilled in the art, transitions are required for DDS receivers to properly derive clock from the received data streams.

It should be noted that the bipolar violation shown in FIG. 3 is required under normal operation of DDSED 204 to transparently suppresses patterns of 7 consecutive zeroes being transmitted to preserve pulse density on the line.

As indicated hereinbefore, according to a preferred embodiment of the invention, a Bit Error Rate Tester (BERT) exists within DDSED 204. BERT's per se are well known by those skilled in the art. According to an exemplary embodiment of the invention, the BERT integrated onto DDSED 204 may be realized by the combination of a transmitter, receiver, bit comparator and an error rate counter, controlled and configured by software.

When enabled, the BERT acts as a source and sink for the PC/DDS adapter card's serial data stream, superceding the HPC. Furthermore, when enabled, the BERT transmitter contemplated as part of the exemplary embodiment of the invention, continuously sources one of four patterns to the DDS network; all 0's, all 1's, the pseudo random 511 pattern of the pseudo random 2047 pattern. Assuming that the network provider has configured a test loopback somewhere in the network, the BERT receiver locks onto the transmitted pattern and performs a bit by bit comparison to the known sequence. Any errors are counted and the count is made available to, for example, software reporting to the user at the conclusion of a test.

The remaining details required by one skilled in the art to properly design DDSED 204 in accordance with DDS network requirements, are set forth completely and in detail in the previously incorporated ATT Technical Reference 62310, at pages 29–31. According to a preferred embodiment of the invention, the DDSED 204 portion of the PC/DDS card depicted in FIG. 2 also incorporates the DSU loopback feature described completely and in detail at pages 15–17 of the incorporated ATT Technical Reference 62310.

LIU 205 shown in FIG. 2 performs the basic functions of: (a) transmit pulse shaping of the TX+, TX− signal (shown on links 290 and 291 respectively in FIG. 2) in accordance with Section 9.4 of the incorporated ATT Technical Reference 62310; (b) recovery of the signal timing clock that is embedded in the receive signal coming from the DDS network (on links 292 and 293 as shown in FIG. 2); and (c) detection of signal polarity reversal that indicates request from the network to loop back data for testing.

Finally, FIG. 2 depicts an RJ45 telephone jack (jack 206) that can be used to connect the PC/DDS adapter card, with cable 299, to the actual DDS line. The exemplary jack (other jacks may be used as well) has 8 leads, 4 of which actually carry signals and 4 which are unused in the illustrative embodiment of the invention being described with reference to FIG. 2.

The pin assignments (according to the illustrative embodiment of the invention) are:

| Pin Number | Function | Direction of Xmit. |
|---|---|---|
| 8 | Receive Data (Ring 1) | Network to Customer |
| 7 | Receive Data (Tip 1) | Network to Customer |
| 2 | Transmit Data (Tip) | Customer to Network |
| 1 | Transmit Data (Ring) | Customer to Network |

Having described an illustrative embodiment of the PC/DDS adapter card portion of the present invention with reference to FIG. 2, reference should now be made to FIG. 4 for a more detailed and specific example of components that, when interconnected as shown in FIG. 4, may be utilized to implement an actual PC/DDS adapter card of the type contemplated herein, shown by way of example in FIG. 2 as card 200.

FIG. 4 depicts the PC Bus Interface (PCBI) 401, SoftSet Serial EEPROM (Electrically Erasable Programmable Read Only Memory) 402, HDLC Packet Controller (HPC) 403; DDS Encoder-Decoder (DDSED) 404, DDS Line Interface Unit (LIU) 405, and RJ45 Telephone Jack 406; which correspond respectively to PC Bus Interface (PCBI) 201, SoftSet Serial EEPROM (Electrically Erasable Programmable Read Only Memory) 202, HDLC Packet Controller (HPC) 203, DDS Encoder-Decoder (DDSED) 204, DDS Line Interface Unit (LIU) 205, and RJ45 Telephone Jack 206 as described with reference to FIG. 2.

The various links depicted in FIG. 2 are shown in greater detail in FIG. 4; but serve to carry the same type of signals previously described with reference to FIG. 2. Telephone jack 406 and PC Bus Physical Connector 407 in FIG. 4, correspond to jack 206 and connector 207 respectively, as shown in FIG. 2.

Starting with DDS Line Interface Unit (LIU) 405, a preferred illustrative embodiment of this portion of the PC/DDS adapter card may be seen to include DDS Line Interface Transceiver 4051; and DDS transformer/current reversal detector 4052.

The Level One LXT400 All Rate, Extended Range DDS Transceiver is a commercially available example of a suitable integrated line interface circuit for Digital Data Service (DDS) that may be used to implement DDS Line Interface Transceiver 4051. The LXT400 is compatible with any combination of 19 to 26 gauge cable at lengths up to 12,000 feet; and may operate at any of 14 settable data rates from 2.4 Kbps (Kilobits per second) to 72.0 Kbps. The LXT400 provides transmit pulse shaping, receive signal detection and timing recovery at the DDS interface.

DDS transformer/current reversal detector 4052 functions to (1) couple signals between DDS Interface Transceiver 4051 and the physical DDS line, taking out the D.C component provided by the DDS central office (and putting the D.C. component into signals being coupled to the DDS network); and (2) detect loopback requests from the central office. Devices to perform the stated functions of DDS transformer/current reversal detector 4052 are well within the ability of those skilled in the art to construct.

HPC 403 is shown in FIG. 4 as being implemented using a commercially available AMD AM85C30 Enhanced Serial Communications Controller (SCC 4031), which provides the low level HDLC data formatting functions required for Frame Relay packets traveling on the DDS line.

SCC 4031 as shown in FIG. 4 connects data packets between the DDS line and the PC bus. Transmit packets are first written to an on-board FIFO that feeds SCC 4031 as required. According to the illustrative embodiment of the invention being described with reference to FIGS. 2 and 4, the FIFO is located in data buffer 4013, shown as part of PCBI 401, and is a 512×8 buffer for storing up to 512 bytes of transmit data.

Received packets are processed by one of the PC bus DMA channels, illustrated by TXDMA and RXDMA links shown coupling SCC 4031 and PC Bus Interface 4011.

SCC 4031's internal control/status registers are accessed by the PC motherboard microprocessor as four consecutive 8-bit locations in PC bus I/O space. The exemplary SCC 4031 is a dual HDLC channel device. On the PC/DDS adapter card contemplated by one embodiment of the invention, Channel A handles data packets; while Channel B handles no data, its sole purpose being to act as a clock divider for the PC/DDS adapter card's Phase Locked Loop (PLL), described hereinafter.

PCBI 401, shown to include PC Bus Interface 4011 Control/Status Registers 4012; and Data Buffer 4013, is the logic that permits the PC's motherboard microprocessor to configure and control the PC/DDS adapter card contemplated by the invention. PCBI 401 maps the PC/DDS card adapter Control/Status Registers (4012), and SCC 4031 internal registers, into 8-bit locations in the PC-bus I/O space.

The starting I/O address (media access control address) is software settable, with no hardware jumpering required. The illustrative PC/DDS adapter card depicted in FIG. 4 occupies a single PC-AT-bus interrupt, selectable under software control (no jumpering required) from 6 candidates. The PC/DDS adapter card requires one AT-bus DMA channel, selectable under software control from 6 candidates.

Control/Status Registers 4012 are a set of read-write, read only or write-only locations on the PC/DDS adapter card, accessible through PC-AT-bus I/O space to control the following functions: selection of AT-bus interrupt, selection of the AT bus DMA channel and DDS line interface control.

Encoder/Decoder 4041, as indicated hereinbefore, may be implemented in a Xilinx Field Programmable Gate Array (FPGA), and performs transmit and receive coding functions required for 4-wire DDS service. On the transmit side, the encoder sends CMIs (Control Mode Idles) when commanded by software to do so and under normal operation transparently suppresses patterns of 7 consecutive zeroes to preserve pulse density on the line. On the receive side, the decoder detects Out Of Service (OOS), Out Of Frame (OOF) and loopback commands from the Central Office. The decoder also transparently detects the Zero Suppression Code and replaces it with 7 consecutive zeroes.

Encoder/Decoder 4041, according to the illustrative embodiment of the invention being set forth herein, supports 3 standard data rates for DDS: 9.6 Kbps, 19.2 Kbps and 56 Kbps. The data rate is software changeable by loading a new hardware program into the FPGA chip, through the AT bus.

Furthermore, Encoder/Decoder 4041, according to the aforementioned illustrative embodiment of the invention, implements an industry standard BERT function for DDS network trouble shooting. As explained hereinbefore, the BERT integrated into Encoder/Decoder 4041 removes the need for field service personal to visit the customer site to connect an external BERT unit for network diagnosis.

Clock Generator 4042 provides the 56 Kbps data clock for the PC/DDS adapter card contemplated by the invention. It uses a PLL to synthesize the clock. The PLL's reference is either supplied by LIU 405 (in particular, via a device like the aforementioned LXT400 as recovered from the DDS receive data); or by test clock oscillator 4043, via a divider chain in channel B of SCC 4031. SCC 4043 divides the test clock down to 4 kHz for the PLL's reference.

Finally, Serial EEPROM 402 provides 1 Kbit of general storage and 8 switch emulation outputs which are loaded automatically on power up from a non-volatile location in the PROM. The switches set the starting location of the PC/DDS adapter card's AT-bus I/O space, removing the need for hardware switches for this function.

Having described hardware suitable for making and using the plug-in variable rate PC/DDS adapter card portion of the invention (containing the integrated DSU and CSU components described hereinbefore, containing hardware to support the aforementioned SoftSet capability, etc.); reference should be made to FIGS. 5–9 for a description of the DDS Driver (control means), and related modules (such as the Bridge/Router control module to be described hereinafter), contemplated by the further aspects of the invention discussed hereinabove in the Summary of the Invention.

Figure 5:
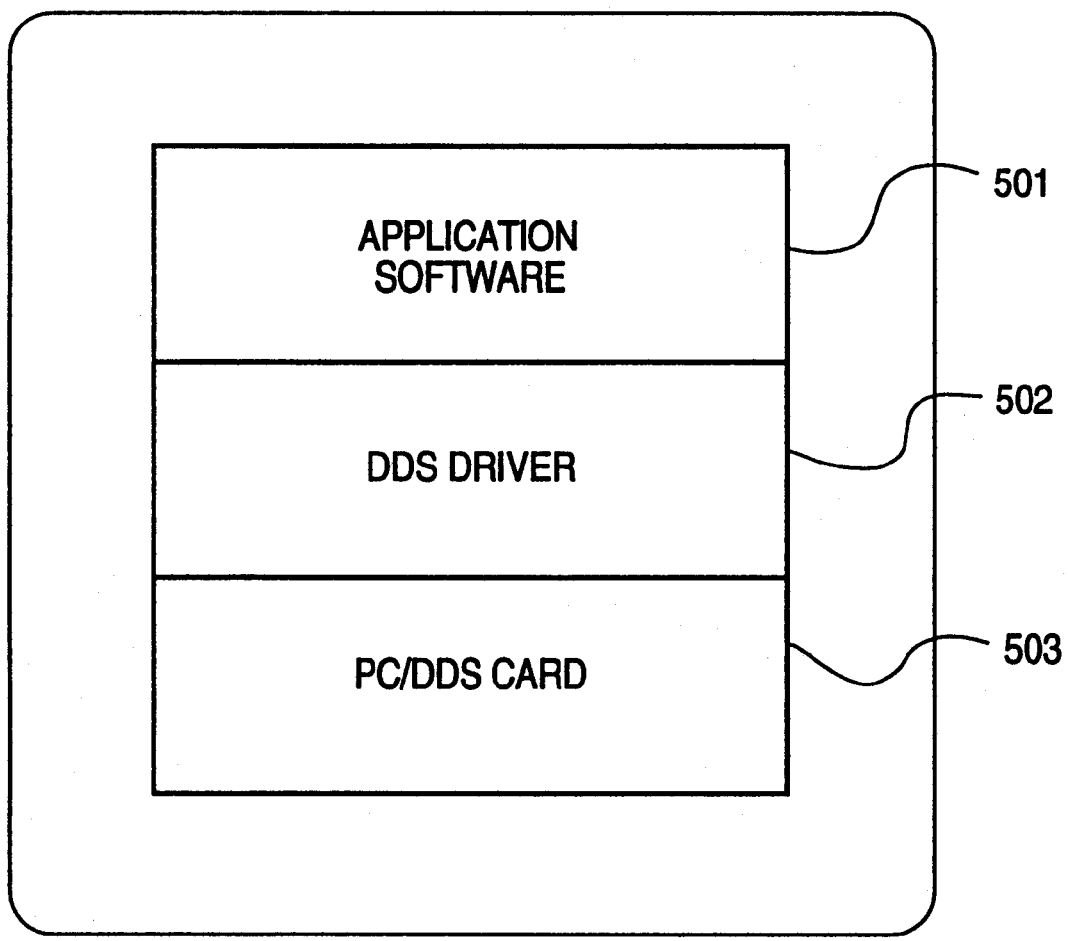
FIG. 5 depicts the layers of software and hardware contemplated by the present invention to directly couple a PC to a DDS network and facilitate LAN extension through the network.

In particular, as indicated hereinbefore, FIG. 5 depicts the layers of software and hardware contemplated by the present invention to directly couple a PC to a DDS network and facilitate LAN extension through the network.

Three layers are shown in FIG. 5: (1) applications software layer 501 running on the PC; (2) the DDS Driver layer 502, to be described in detail hereinafter with reference to FIGS. 6–8; and (3) the PC/DDS adapter card itself (layer 503), already described hereinabove with reference to FIGS. 2 and 4.

Figure 6:
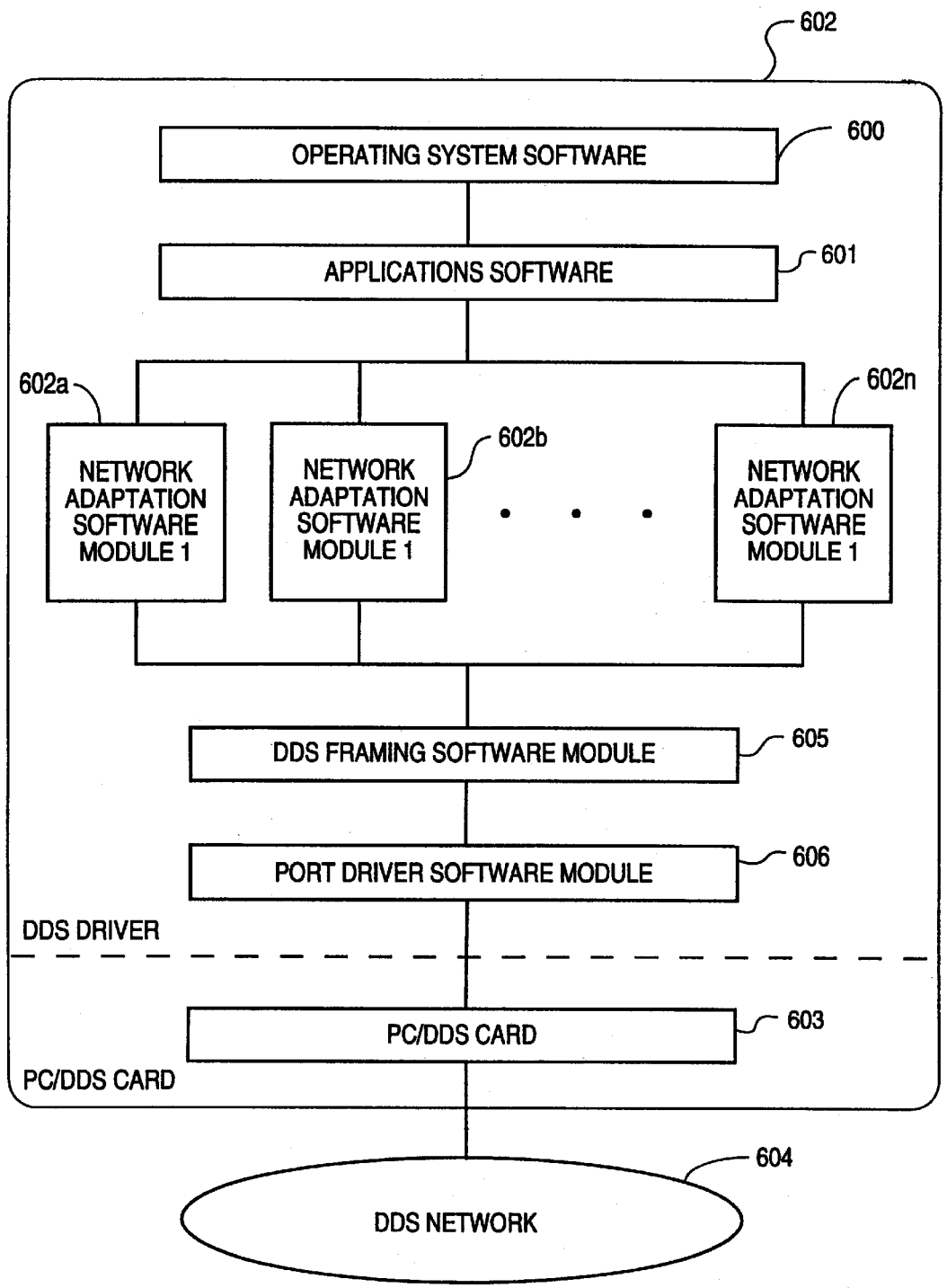
FIG. 6 is more detailed block diagram of the layers of software and hardware contemplated by the present invention. In particular.

Reference should now be made to FIG. 6 which is a more detailed block diagram of the layers of software and hardware contemplated by the present invention.

FIG. 6 depicts the applications software level, shown in FIG. 5 as 501, at block 601 of FIG. 6. The applications software is shown running under some PC operating system (like DOS), depicted at block 600 of FIG. 6. FIG. 6 also depicts DDS Driver 602 (corresponding to level 502 in FIG. 5); and PC/DDS adapter card 603, coupled to DDS 604, where card 603 corresponds to the card depicted at level 503 in the FIG. 5 illustration.

More particularly, FIG. 6 depicts the details of DDS Driver 602 (driver at level 502 in FIG. 5), calling out Network Adaptation Module(s) 602a–602n; DDS Framing Module 605 and a Port Driver Module (606) which is used to set up and manage communications between applications software running on a PC and the DDS network (via a PC/DDS adapter card such as the one depicted in FIGS. 2 and 4), to facilitate LAN extension through the DDS network by emulating direct connectivity of the PC to the LAN.

Those skilled in the art can readily implement the DDS Driver (control means) with an understanding of the function of the various driver components as set forth in detail hereinafter.

Port driver module 606 provides hardware transparency to the software modules running above the port driver layer. According to a preferred embodiment of the invention the port driver is a software module that runs under DOS (or any other PC based operating system) on the PC motherboard microprocessor and is responsible for initializing, configuring and controlling the PC/DDS adapter card hardware.

At driver load time, initialization functions are performed by Port Driver Module 606 which set the PC/DDS adapter card to a known operational state. This is done via programming the on-board registers and programmable hardware devices such as the SCC 4031 HDLC controller and Serial EEPROM 402, previously described herein with reference to FIG. 4.

During DDS Driver operations, additional configuration functions may be performed under the control of Port Driver Module 606 whenever the dynamic characteristics of the system change. This, according to a preferred embodiment of the invention, can include making alterations to frame format, line speed, line encoding, data path routing, etc.

Finally, before driver shutdown, reset functions are performed by Port Driver Module 606 to place the line and PC/DDS adapter card in a known acceptable state during an out-of-service period.

Sitting above the port driver layer, shown as module 605 in FIG. 6, is the DDS Framing Module portion of DDS Driver 602. According to a preferred embodiment of the invention DDS Framing Module 605, like Port Driver Module 606, is a software module that runs under a PC based operating system on the PC motherboard microprocessor.

DDS Framing Module 605 operates in two modes. First to establish a network level interface, and secondly to format (and reformat) actual data being transmitted (or received).

In the first mode, DDS framing nodule 605 establishes a network level interface in combination with Port Driver Module 606 and the PC/DDS adapter card 603 itself. For example, DDS Framing Module 605, via Port Driver Module 606 and PC/DDS adapter card 603, sends control packets into the network such as "link-request" and waits for a network generated "link-up" acknowledge signal as part of a conventional process of establishing a network level interface.

This first mode of operation does not contemplate the data formatting (or reformatting) function referred to hereinabove here; the first mode of operation takes place at system initialization time; not when user data is being sent.

In the second mode of operation DDS Framing Module 605 is the one module in the DDS Driver that, according to a preferred embodiment of the invention, actually massages data going out to or coming in from the synchronous DDS "pipe". For example, DDS Framing Module 605 is responsible for inserting and stripping headers, compressing and decompressing data, etc. DDS Framing Module 605 reframes both incoming and outgoing data packets.

In addition to the functions mentioned hereinabove, DDS Framing Module 605 maintains the network protocol link by, for example, sending "keep alive" messages into the network for as long as a link through the network is required.

The Network Adaptation Modules, shown as modules 602a–602n in FIG. 6, function in part as existing standard interfaces (usually software interfaces) which allow applications software running on the PC to communicate with a LAN adaptor. An example of one such commercially available software interface (emulated by an exemplary DDS Driver Network Adaptation Module), is EXP16 LAN Driver software used for driving the commercially available Intel EtherExpress card.

A LAN adaptor provides applications software running on a PC with a way to communicate over a LAN, with the adaptor being driven by commercially available LAN Driver software; whereas (but analogously), the PC/DDS adapter card contemplated by the invention allows for LAN extendability through a DDS network, as explained hereinbefore, with the PC/DDS adapter being driven by the DDS Driver as a whole, and by a Network Adaptation Module portion of the DDS Driver which treats data coming from the PC/DDS adapter card (flowing towards the PC) as if it came from a specific type of supported LAN adapter.

Examples of commercially available LAN Driver software specifications which may be incorporated into Network Adaptation Modules 602a–602n (one specification per module) are the previously incorporated NDIS driver, ODI driver and FTP driver specifications. Once incorporated into a given Network Adaptation Module, these specifications allow the PC to communicate with software or hardware used to control a LAN interface.

According to one aspect of the invention, the Network Adaptation Modules each function, looking up towards the applications software level, the same as any other driver software implementing the aforementioned commercially available specifications. Looking down toward the DDS Framing Module layer, the Network Adaptation Modules convert data (at the interface with the DDS Framing Module) into a format that lower layers of the DDS Driver can understand; and conversely into a format that applications software would expect from a particular supported LAN Driver.

In short, each Network Adaptation Module is a LAN interface emulator plus additional software which provides an interface between applications software and the aforementioned DDS Framing Module. The additional software, since a LAN Driver is not in fact being driven by the DDS Driver, converts the data and control indications at that Network Adaptation Module/DDS Framing Module interface, into messages or control indications recognized by the DDS Framing module. For example, since a plurality of LAN Drivers are supported by the present invention, the additional software must convert Network Adaptation Module output, sent to the DDS Framing Module, into a standardized form for handling by the DDS Framing Module.

According to the preferred embodiment of the invention, each of the Network Adaptation Modules, performing the functions described hereinabove, is implemented in software running under a PC based operating system on the PC motherboard microprocessor.

In fact, all of the DDS Driver, if implemented in software, could, for example, be resident in PC memory space (although this is not required to practice the invention).

Figure 7:
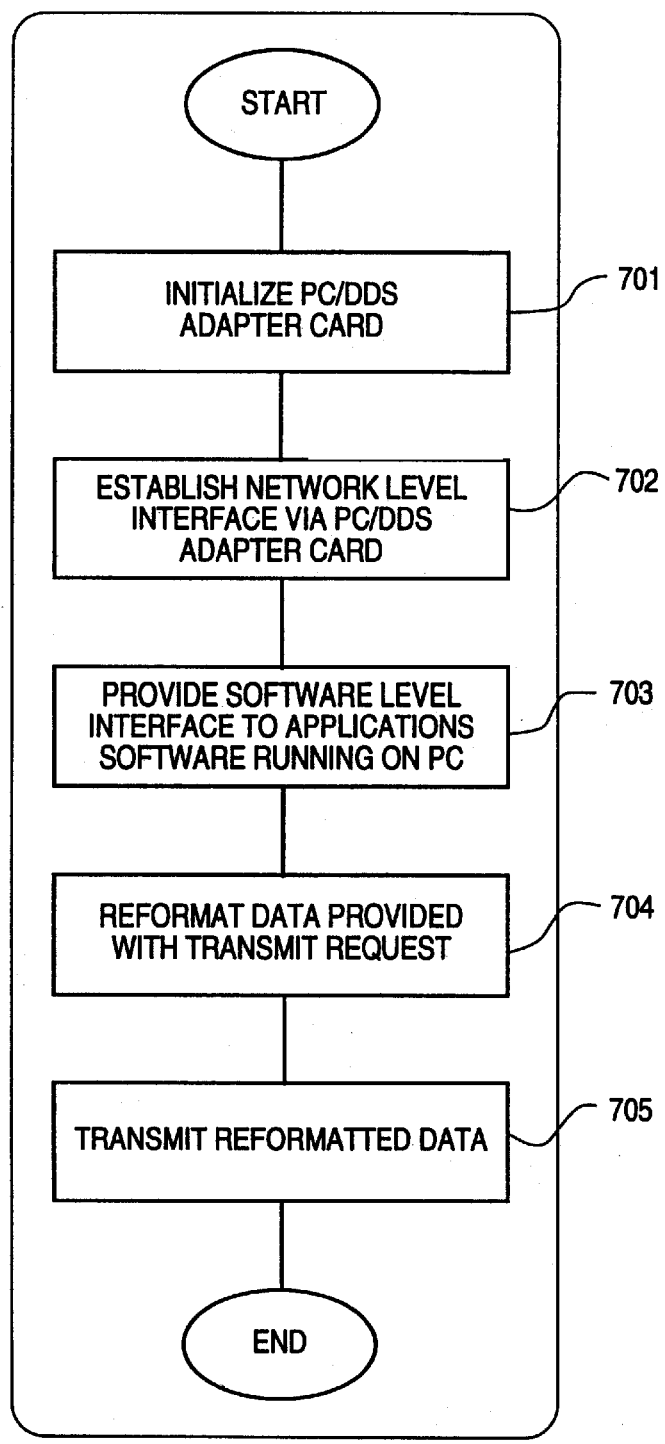
FIG. 7 depicts in flow chart form a set of functional steps that, in accordance with a preferred embodiment of the invention, may be performed by software running on the PC motherboard microprocessor to realize the transmit function of the DDS Driver depicted in FIG. 6.

Having described the components of the DDS Driver contemplated by the invention, reference should now be made to FIG. 7 which depicts, in flow chart form, a set of functional steps that, in accordance with a preferred embodiment of the invention, may be implemented as software running on the PC motherboard microprocessor to realize the transmit function of the DDS Driver depicted in FIG. 6.

In particular, block 701 in FIG. 7 sets forth the functional step of initializing PC/DDS adapter card, previously described hereinabove with reference to the DDS Driver's Port Driver Module.

Next, block 702 in FIG. 7 sets forth the functional step of establishing a network level interface to the DDS network via the PC/DDS adapter card, previously described hereinabove with reference to a combination of the DDS Driver's DDS Framing Module, Port Driver Module and PC/DDS adapter card per se.

Block 703 in FIG. 7 sets forth the functional step of providing a software level interface to network applications software running on the PC, previously described hereinabove with reference to the DDS Driver's Network Adaptation Modules.

Block 704 in FIG. 7 sets forth the functional step of reformatting data provided via a transmit request from network applications software running on the PC into a form in which it can be sent over the DDS, previously described hereinabove with reference to the DDS Driver's DDS Framing Module.

Block 705 in FIG. 7 sets forth the functional step of actually transmitting or "handing off" the reformatted data, previously described hereinabove with reference to the DDS Driver's Port Driver Module and PC/DDS adapter card per se.

Figure 8:
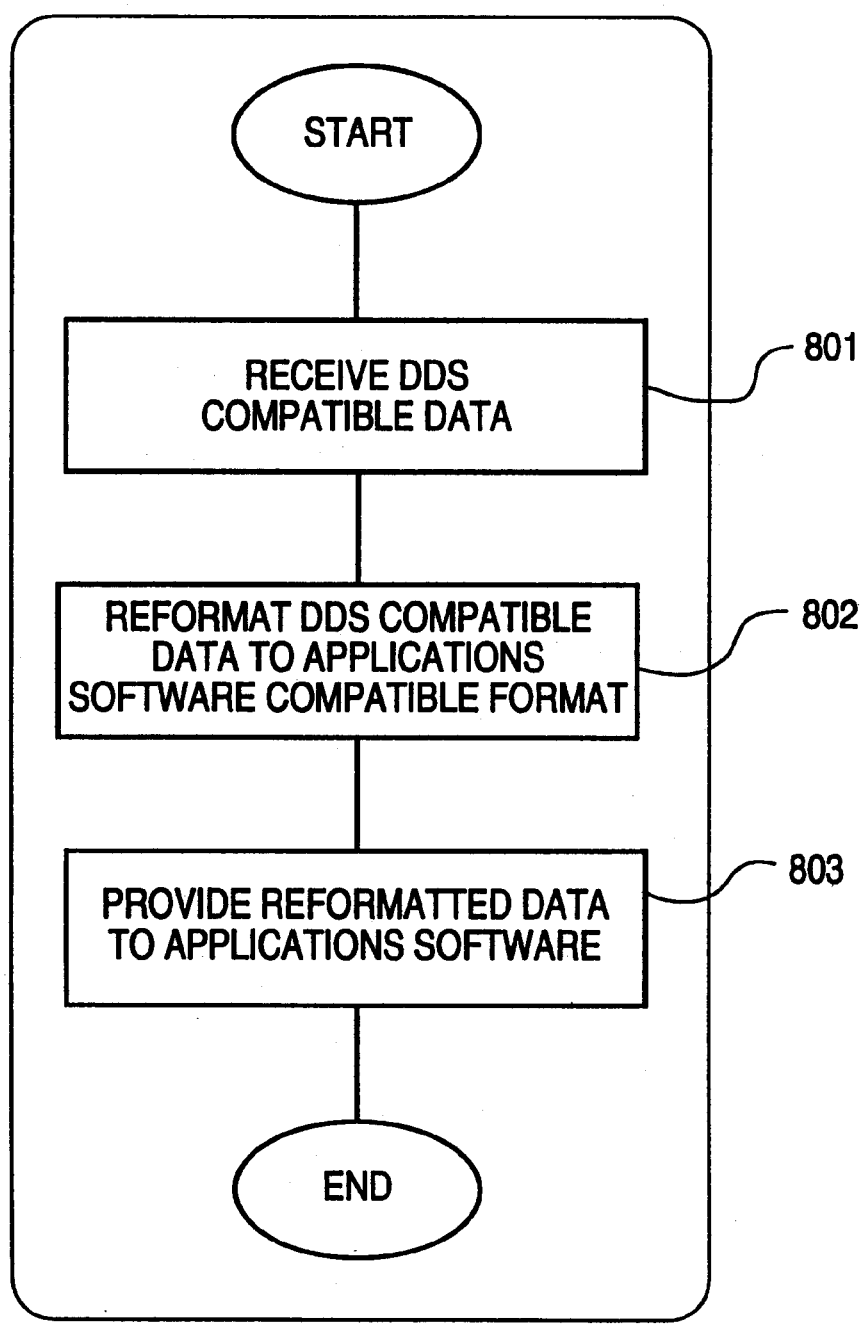
FIG. 8 depicts in flow chart form a set of functional steps that, in accordance with a preferred embodiment of the invention, may be performed by software running on the PC motherboard microprocessor to realize the receive function of the DDS Driver depicted in FIG. 6.

Reference should now be made to FIG. 8 which depicts, in flow chart form, a set of functional steps that, in accordance with a preferred embodiment of the invention, may be implemented as software running on the PC motherboard microprocessor to realize the receive function of the DDS Driver depicted in FIG. 6.

In particular FIG. 8, at block 801, sets forth the functional step of actually receiving DDS compatible data off the DDS link, previously described hereinabove with reference to the PC/DDS adapter card per se.

Block 802 in FIG. 8 sets forth the functional step of reformatting DDS compatible data to a format that is applications software compatible, previously described hereinabove with reference to the DDS Driver's DDS Framing Module.

Block 803 in FIG. 8 sets forth the functional step of actually providing reformatted data to the applications software, previously described hereinabove with reference to the DDS Driver's Network Adaptation Modules.

Figure 9:
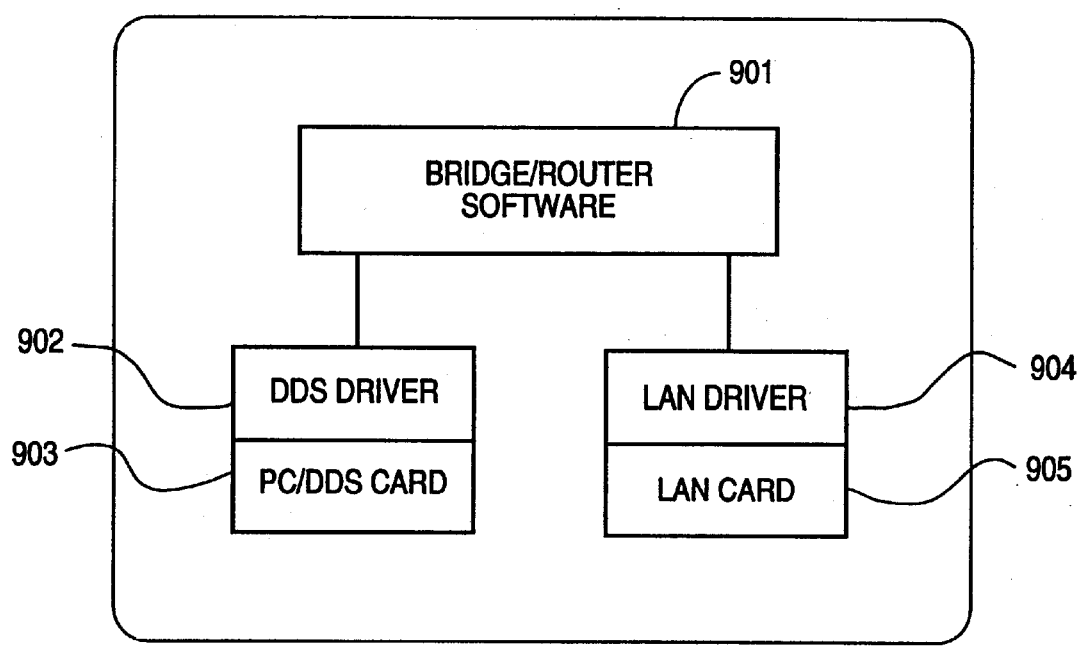
FIG. 9 depicts the layers of software and hardware contemplated by a further aspect of the present invention to directly couple an existing LAN to a DDS network and facilitate extension of that LAN to PCs or other LANs utilizing a bridge/router application in combination with a PC/DDS adapter card and DDS Driver of the type depicted by way of example in FIG. 2 and FIG. 6, respectively.

Reference should now be made to FIG. 9 which depicts a set of software and hardware layers, contemplated by a further aspect of the present invention, for directly coupling an existing LAN to a DDS network and facilitate extension of that LAN to PCs or other LANs utilizing a bridge/router application in combination with a PC/DDS adapter card and DDS Driver of the type depicted and described with reference to FIG. 2 and FIG. 6, respectively.

In particular FIG. 9 shows bridge/router module 901 (implementable in software) as any other piece of network applications software, sitting above the previously described DDS Driver (902) and PC/DDS adapter card (903). Bridge/router module 901 serves as a gateway between DDS Driver 902 and an actual LAN Driver (like the aforementioned EXP-16 LAN Driver software used for driving a commercially available Intel EtherExpress card), shown in FIG. 9 as LAN Driver 904, driving LAN card 905.

The function of a bridge/router module in general, well known by those skilled in the art, is two fold. A bridge/router module attempts to "learn" the identity (LAN or network address) of PCs attached to the LAN (directly or virtually) from data received by the bridge/router module. The bridge/router module then decides whether to target input data to a specific PC (if the target PC is already known or was previously learned as being attached to the LAN or extend LAN), broadcast the data on the LAN if the target is not known for sure to be attached, or to discard the packet because its destination or "next hop" is not known.

The bridge function targets data to a specific LAN address (i.e., MAC (media access control) address); whereas a router function targets data to a specific network address (instead of LAN address) such as, for example, an Internet Protocol address.

In the context of the present invention, bridging/routing as described hereinabove is performed in combination with the aforementioned DDS driver and PC/DDS adapter card, i.e., the bridge/router is used in combination with a LAN emulator for virtually extending a LAN through a DDS.

Those skilled in the art will readily appreciate that published specifications exist for implementing a suitable bridge/router for use in the context of the invention. For example, a specification for implementing a MAC layer bridge, entitled "P802.1d MAC Bridges", Document Number P802.1d/D9, was published on Jul. 14, 1989, by the IEEE; and a specification for implementing an Internet Protocol (IP) router, entitled "Towards Requirements for IP Routers", Document Number RFC 1716 was published Nov. 11, 1994, by P. Almquist and F. Kastenholz. The aforementioned illustrative specifications are hereby incorporated by reference.

Figure 10:
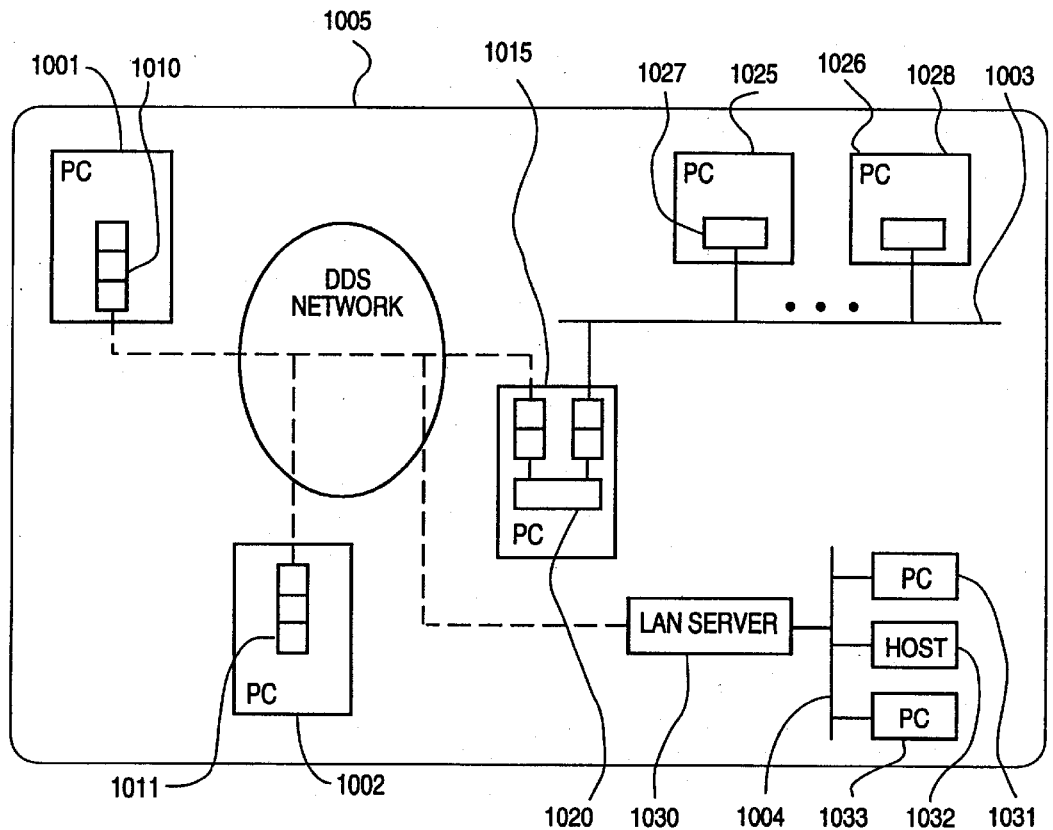
FIG. 10 depicts PC to PC, PC to LAN and LAN to LAN connectivity achieved through a DDS network using PCs that incorporate the PC/DDS adapter card and related software contemplated by the instant invention, and which further includes a LAN server incorporating a PC/DDS adapter card, related software, and the bridge/router applications software contemplated by the present invention.

Having described the bridge/router function contemplated by the invention (to effectively realize a LAN server), reference should be made to FIG. 10.

As indicated hereinbefore, FIG. 10 depicts PC to PC, PC to LAN and LAN to LAN connectivity achieved through a DDS network using PCs that incorporate the PC/DDS adapter card and related software contemplated by the instant invention, and which further includes a LAN server incorporating a PC/DDS adapter card, related software, and the bridge/router applications software contemplated by the present invention.

In particular, FIG. 10 depicts two PCs (1001 and 1002) and two LANs (1003 and 1004), all linked to one another via DDS network 1005, in a manner contemplated by the invention. PC 1001 and PC 1002 may be thought of as extensions of both LANs 1003 and 1004, through DDS network 1005. In fact, LANs 1003 and 1004 may be thought of as extensions of one another through DDS network 1005.

The three boxes shown at 1010 and 1011 in FIG. 10 are meant to represent the applications software, DDS Driver, PC/DDS adapter card hierarchy (installed in PC 1001 and PC 1002, respectively), as previously described hereinabove with reference to FIG. 5. I.E., PC 1001 and PC 1002 are shown configured to include the PC/DDS adapter card and DDS Driver described herein.

The five boxes shown inside PC 1015 (identified by reference numeral 1020 in FIG. 10) are meant to represent the applications software, DDS Driver, LAN Driver, LAN card and bridge/router module hierarchy as previously described hereinabove with reference to FIG. 9. I.E., PC 1015 in FIG. 10 is shown configured to act as the LAN server described hereinabove with reference to FIG. 9.

PC 1025 and PC 1026 in FIG. 10 are ordinary PCs attached in a conventional fashion to LAN 1003 using LAN cards 1027 and 1028, respectively.

Finally FIG. 10 depicts LAN server 1030, designed in accordance with the teachings of the present invention to facilitate extension of LAN 1004 thru DDS network 1005, with other PC and host resources (1031–1033) shown attached to LAN 1004. By using the teachings of the invention, all of the other devices attached to and thru DDS network 1005 (to LAN 1004), have access to the resources attached to LAN 1004.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A software-controlled PC adapter card interconnected to a personal computer, said PC adapter card interconnecting said personal computer to a local area network, said local area network extending to said personal computer through a digital wide area network including synchronous digital lines, said personal computer including a motherboard microprocessor controlling software settable switches, said software settable switches having settings embodying status information, said personal computer receiving and transmitting asynchronous parallel data in an asynchronous parallel data stream and said digital wide area network carrying synchronous bit serial data in the form of differential bipolar encoded signals, said PC adapter card comprising:

data service means, located on said PC adapter card and coupled to said personal computer, for converting between said asynchronous parallel data stream and a synchronous bit serial data stream, said data service means including programmable means for providing non-volatile storage of the settings of said software settable switches; and channel service means, located on said PC adapter card and coupled to said data service means, for providing an interface between said data service means and said digital wide area network, said PC adapter card emulating a local area network interface card to transparently interconnect said personal computer to said local area network through said digital wide area network.

2. A PC adapter card as set forth in claim 1 wherein said data service means further comprises:

PC bus interface means for providing an interface between a PC bus carrying asynchronous parallel data, said PC bus interface means including a PC bus memory map, said PC bus interface means being coupled to said programmable means; and converter means, coupled to said PC bus interface means and receiving single ended format signals, (i) for generating serial data signals by performing parallel to serial conversion of data being transmitted from said personal computer over said digital wide are network and (ii) for generating parallel data signals by performing serial to parallel conversion of data being received by said personal computer from said digital wide area network.

3. A PC adapter card as set forth in claim 2 wherein said programmable means comprises a software settable serial EEPROM.

4. A PC adapter card as set forth in claim 2 wherein said settings include a starting address indicative of a location of the PC adapter card in said PC bus memory map.

5. A PC adapter card as set forth in claim 2 wherein said settings include an interrupt request line parameter.

6. A PC adapter card as set forth in claim 2 wherein said settings include a Direct Memory Access (DMA) channel parameter.

7. A PC adapter card as set forth in claim 2 wherein said converter means comprises an HDLC packet controller.

8. A PC adapter card as set forth in claim 2 wherein said PC bus interface means further comprises a data buffer and a set of control/status registers for controlling both said data buffer and said programmable means.

9. A PC adapter card as set forth in claim 2 wherein said channel service means further comprises:

means for encoding said serial data signals output from said converter means into a differential bipolar format signal for transmission on said synchronous digital lines of said digital wide area network;

synchronous digital line interface means, coupled to said means for encoding, for performing transmit pulse shaping; and means for physically interconnecting said synchronous digital line interface means with said digital wide area network.

10. A PC adapter card as set forth in claim 9 wherein said channel service means further comprises a programmable bit error rate tester (BERT).

11. A PC adapter card as set forth in claim 2 wherein said channel service means further comprises:

means for decoding said differential bipolar format signals received from said digital wide area network into a single ended format signal for input to said converter means;

synchronous digital line interface means, coupled to said means for decoding, for performing receive signal detection and clock recovery at the physical DDS network interface; and means for physically interconnecting said synchronous digital line interface means with said digital wide area network.

12. A PC adapter card as set forth in claim 2 wherein said channel service means further comprises a variable rate signal encoder/decoder, coupled to said converter means, (i) for encoding said serial data signals generated by said converter means into a differential bipolar format signal for transmission on said digital wide area network and (ii) for decoding differential bipolar format signals received from said digital wide area network into a single ended format signal for input to said converter means.

13. A PC adapter card as set forth in claim 12 wherein said variable rate signal encoder/decoder further comprises a field programmable gate array dynamically programmable to support any one of a plurality of line speeds.

14. A PC adapter card as set forth in claim 12 wherein said variable rate signal encoder/decoder enables loop back testing.

15. A PC adapter card as set forth in claim 12 further comprising:

synchronous digital line interface means, coupled to said variable rate signal encoder/decoder, for performing transmit pulse shaping, receive signal detection and clock recovery at the physical DDS network interface; and means for physically interconnecting said synchronous digital line interface means with the digital wide area network.

16. A PC adapter card as set forth in claim 15 wherein said synchronous digital line interface means detects signal polarity reversal indicative of a digital wide area network request for loop back testing.

17. A PC adapter card as set forth in claim 16 wherein said means for physically interconnecting said synchronous digital line interface means with the digital wide area network is a telephone jack.

18. A method for transparently interconnecting a local area network to a remote personal computer through a digital wide area network, comprising the steps of:

incorporating in said personal computer a programmable PC adapter card, including an on board Data Service Unit and Channel Service Unit, said Data Service Unit including a non-volatile memory, said PC adapter card providing an interface between said personal computer and said digital wide area network;

programming said non-volatile memory with at least one parameter; and applying control means to drive said PC adapter card, said control means emulating a local network interface.

19. A method as set forth in claim 18, wherein said at least one parameter includes an interrupt request parameter.

20. A method as set forth in claim 18, wherein said at least one parameter includes a Direct Memory Access (DMA) channel parameter.

21. A method as set forth in claim 18, wherein said at least one parameter includes an adapter card address.

22. A method as set forth in claim 18, wherein said at least one parameter includes a line speed parameter.

23. A method as set forth in claim 18, wherein said at least one parameter includes an interrupt request parameter, a Direct Memory Access (DMA) channel parameter, an adapter card address parameter and a line speed parameter.

24. A method as set forth in claim 18 further comprising the step of establishing connectivity between at least one personal computer and at least one local area network, each separately connected to said digital wide area network via a gateway access through said digital wide area network.

25. A method as set forth in claim 18 further comprising the step of executing user applications and packet protocols simultaneously on said personal computer.

\* \* \* \* \*